United States Patent
Jeon et al.

(10) Patent No.: US 10,302,032 B2
(45) Date of Patent: May 28, 2019

(54) ENGINE INCLUDING CONTROL UNIT FOR REGULATING OPENING DEGREE OF EGR VALVE, AND METHOD FOR CONTROLLING EGR VALVE OF ENGINE

(71) Applicant: Doosan Infracore Co., Ltd., Incheon (KR)

(72) Inventors: Phil Gyu Jeon, Gyeonggi-do (KR); Jin Hwa Chung, Gyeonggi-do (KR); Eun A Kang, Gyeonggi-do (KR); Duk Sang Kim, Incheon (KR)

(73) Assignee: DOOSAN INFRACORE CO., LTD., Incheon (KR)

( * ) Notice: Subject to any disclaimer, the term of this patent is extended or adjusted under 35 U.S.C. 154(b) by 0 days.

(21) Appl. No.: 15/572,418

(22) PCT Filed: May 9, 2016

(86) PCT No.: PCT/KR2016/004809
§ 371 (c)(1),
(2) Date: Nov. 7, 2017

(87) PCT Pub. No.: WO2016/182286
PCT Pub. Date: Nov. 17, 2016

(65) Prior Publication Data
US 2018/0283298 A1    Oct. 4, 2018

(30) Foreign Application Priority Data
May 8, 2015   (KR) .................. 10-2015-0064377

(51) Int. Cl.
*F02M 21/02*    (2006.01)
*F02M 31/08*    (2006.01)
(Continued)

(52) U.S. Cl.
CPC ......... *F02D 41/0077* (2013.01); *F02D 21/08* (2013.01); *F02D 41/005* (2013.01);
(Continued)

(58) Field of Classification Search
CPC ............ F02D 41/0027; F02D 41/0077; F02D 2200/101; F02M 21/08; F02M 21/0215; F02M 26/07; F02M 26/47
(Continued)

(56) References Cited

U.S. PATENT DOCUMENTS 5,172,550 A * 12/1992 Takeshima ............ F02D 41/005
                                                        123/568.26
5,724,950 A *  3/1998 Shino .................. F02D 41/0065
                                                        123/568.21
(Continued)

FOREIGN PATENT DOCUMENTS

| JP | 2000-097017 A | 4/2000 |
| KR | 20-1998-0027804 U | 8/1998 |
| KR | 10-2010-0116376 A | 11/2010 |

OTHER PUBLICATIONS

International Search Report (with English translation) issued in international application No. PCT/KR2016/004809, dated Aug. 16, 2016, 9 pages.
(Continued)

*Primary Examiner* — Hieu T Vo
*Assistant Examiner* — Arnold Castro
(74) *Attorney, Agent, or Firm* — K&L Gates LLP

(57) ABSTRACT

The present invention relates to control of an opening degree of an exhaust gas recirculation (EGR) valve which is provided in an engine which uses compressed natural gas as fuel. A method for controlling an EGR valve of an engine according to the present invention includes: calculating the amount of exhaust gas to be transferred from an exhaust line
(Continued)

to an intake line according to engine operating conditions; regulating an opening degree of an EGR valve based on the calculated amount of exhaust gas; measuring a temperature of exhaust gas discharged from a combustion chamber; and increasing the opening degree of the EGR valve by a preset increment when the temperature of the exhaust gas discharged from the combustion chamber exceeds a preset reference temperature.

11 Claims, 3 Drawing Sheets

(51) Int. Cl.
    *F02D 41/00*     (2006.01)
    *F02D 21/08*     (2006.01)
    *F02M 26/47*     (2016.01)
    *F02D 41/14*     (2006.01)

(52) U.S. Cl.
    CPC ..... *F02D 41/0027* (2013.01); *F02D 41/0052* (2013.01); *F02D 41/0072* (2013.01); *F02D 41/1446* (2013.01); *F02M 21/0215* (2013.01); *F02M 26/47* (2016.02); *F02D 2200/101* (2013.01); *F02D 2200/1002* (2013.01); *Y02T 10/32* (2013.01)

(58) Field of Classification Search
    USPC .................................................. 123/568.21
    See application file for complete search history.

(56) References Cited

U.S. PATENT DOCUMENTS

| | | | | |
|---|---|---|---|---|
| 6,039,025 | A | * | 3/2000 | Iwano ................. F02D 41/0065 123/399 |
| 7,263,428 | B2 | * | 8/2007 | Kobayashi .......... F02D 41/0072 123/568.21 |
| 7,454,896 | B2 | | 11/2008 | Chalgren et al. |
| 2002/0129800 | A1 | * | 9/2002 | Russell ............... F02D 41/0072 123/568.16 |
| 2006/0207580 | A1 | * | 9/2006 | Hardman ............ F02D 35/0007 123/568.21 |
| 2012/0318247 | A1 | | 12/2012 | Nogami |
| 2015/0114367 | A1 | * | 4/2015 | Makino ............... F02D 41/0072 123/568.21 |
| 2016/0146137 | A1 | * | 5/2016 | Hagari ................ F02D 41/0072 123/350 |
| 2016/0215716 | A1 | * | 7/2016 | Yamamoto .......... F02D 41/1458 |

OTHER PUBLICATIONS

Written Opinion issued in international application No. PCT/KR2016/004809, dated Aug. 16, 2016, 3 pages.

* cited by examiner

ENGINE INCLUDING CONTROL UNIT FOR REGULATING OPENING DEGREE OF EGR VALVE, AND METHOD FOR CONTROLLING EGR VALVE OF ENGINE

CROSS REFERENCE TO RELATED APPLICATIONS

The present application is a National Stage of International Application No. PCT/KR2016/004809, filed on May 9, 2016, which claims priority to Korean Patent Application No. 10-2015-0064377, filed on May 8, 2015, the entire contents of which are incorporated herein by reference.

TECHNICAL FIELD

The present invention relates to control of an opening degree of an exhaust gas recirculation (EGR) valve which is provided in an engine which uses compressed natural gas as fuel.

BACKGROUND ART

In an engine system, an exhaust gas recirculation (EGR) system decreases a combustion temperature of an engine by re-circulating part of exhaust gas, discharged from the engine, to a combustion chamber of the engine, thereby reducing the amount of nitrogen oxide NOx to be generated. The EGR system includes an exhaust gas recirculation line branched off from an exhaust line of the engine and extended to an intake line of the engine, and an EGR valve configured to regulate the amount of exhaust gas entering from the exhaust line to the intake line is provided in the exhaust gas recirculation line. The EGR valve regulates the amount of exhaust gas to be re-circulated to the intake line by regulating an opening rate of the exhaust gas recirculation line.

Meanwhile, a diesel engine and a compressed natural gas (CNG) engine use an EGR system for different purposes. A diesel engine uses an EGR system for the purpose of reducing the amount of NOx to be generated by chiefly decreasing a combustion temperature within a cylinder. A diesel engine can fulfill exhaust gas regulations only by accurately controlling the amount of exhaust gas to be re-circulated throughout an overall operation range. In contrast, a CNG engine uses EGR chiefly for the purpose of decreasing a temperature of exhaust gas rather than for the purpose of preventing NOx from being generated because the CNG engine emits a considerably lower amount of NOx than a diesel engine. In a CNG engine, when a temperature of exhaust gas is excessively high, durability of parts related to an exhaust line must be high, with the result that a cost of a product is increased. Accordingly, in a CNG engine composed of parts of an exhaust line having relatively low durability, it is necessary to perform control through EGR so that a temperature of exhaust gas can be maintained at a reference value or lower. For this purpose, a CNG engine generally uses a method of additionally providing a universal exhaust gas oxygen (UEGO) sensor in an intake line and performing closed-loop control in order to perform EGR valve control. However, this method is problematic in that the cost is increased due to the addition of the expensive UEGO sensor. Furthermore, the fact that the UEGO sensor is weak to moisture included in exhaust gas supplied through an exhaust gas recirculation line must be taken into account, and thus a problem arises in that a configuration becomes complex in order to ensure durability of EGR valve control.

DISCLOSURE

Technical Problem

The present invention is intended to solve the above-described problems of the background art, and an object of the present invention is to provide an EGR valve control device and control method, which are capable of maintaining a temperature of exhaust gas at a reference temperature or lower in a CNG engine by means of a simple configuration.

Technical Solution

In order to accomplish the above object, an exemplary embodiment of the present invention provides an engine including: a combustion chamber; an intake line configured to supply air to the combustion chamber; an exhaust line configured to discharge exhaust gas discharged from the combustion chamber; a recirculation line configured to transfer part of the exhaust gas, discharged through the exhaust line, to the intake line; an exhaust gas temperature measuring device configured to measure a temperature of the exhaust gas discharged from the combustion chamber; an exhaust gas recirculation (EGR) valve configured to regulate the amount of exhaust gas passing through the recirculation line; and a control unit configured to calculate the amount of exhaust gas passing through the recirculation line according to engine operating conditions, and to regulate the EGR valve to a first EGR valve opening degree; wherein the control unit regulates the EGR valve to a second EGR valve opening degree, obtained by increasing the first EGR valve opening degree by a preset increment, when the temperature of the exhaust gas measured by the exhaust gas temperature measuring device exceeds a preset reference temperature.

In this case, the engine may use compressed natural gas as fuel.

Furthermore, the operating conditions may include an engine load and an engine speed.

Furthermore, the increased opening degree of the EGR valve may be decreased from the second EGR valve opening degree to the first EGR valve opening degree when the temperature of the exhaust gas measured by the exhaust gas temperature measuring device is decreased to the reference temperature or lower.

Furthermore, the increment may be set to a value which varies depending on the opening degree of the EGR valve calculated according to the engine operating conditions.

Furthermore, the reference temperature may be a value in a range from 700 to 850° C.

The control unit may regulate the EGR valve opening degree so that an EGR rate becomes a preset reference EGR rate or lower in a state of having been regulated to the second EGR valve opening degree.

Additionally, the reference EGR rate may be a value in a range from 20 to 30%.

Furthermore, an exemplary embodiment of the present invention provides a method for controlling an exhaust gas recirculation (EGR) valve of an engine, the method including: calculating the amount of exhaust gas to be transferred from an exhaust line to an intake line according to engine operating conditions; regulating an opening degree of an EGR valve based on the calculated amount of exhaust gas; measuring a temperature of exhaust gas discharged from a combustion chamber; and increasing the opening degree of the EGR valve by a preset increment when the temperature of the exhaust gas discharged from the combustion chamber exceeds a preset reference temperature.

Furthermore, the operating conditions may include an engine load and an engine speed.

In this case, increasing the opening degree of the EGR valve may include setting the increment to a value which varies depending on the opening degree of the EGR valve calculated according to the engine operating conditions.

Furthermore, the reference temperature may be a value in a range from 700 to 850° C.

Furthermore, the method may further include: calculating an EGR rate; determining whether the EGR rate exceeds a reference EGR rate; and decreasing the opening degree of the EGR valve when the EGR rate exceeds the reference EGR rate.

Furthermore, the reference EGR rate may be a value in a range from 20 to 30%.

Advantageous Effects

According to an embodiment of the present invention, a temperature of exhaust gas can be appropriately controlled by regulating an opening degree of an EGR valve without a need to mount an additional sensor, thereby providing effects of reducing manufacturing cost and simplifying a structure of an engine system.

MODE FOR INVENTION

Preferred embodiments of the present invention will be described in detail below with reference to the accompanying drawings. First, it should be noted that when reference symbols are assigned to components of the drawings, the same component will be designated by the same reference symbol as much as possible even when it is illustrated in different drawings. Furthermore, in the following description of the present invention, when it is determined that a detailed description of a well-known component or function may unnecessarily make the gist of the present invention obscure, the detailed description will be omitted.

Figure 1:
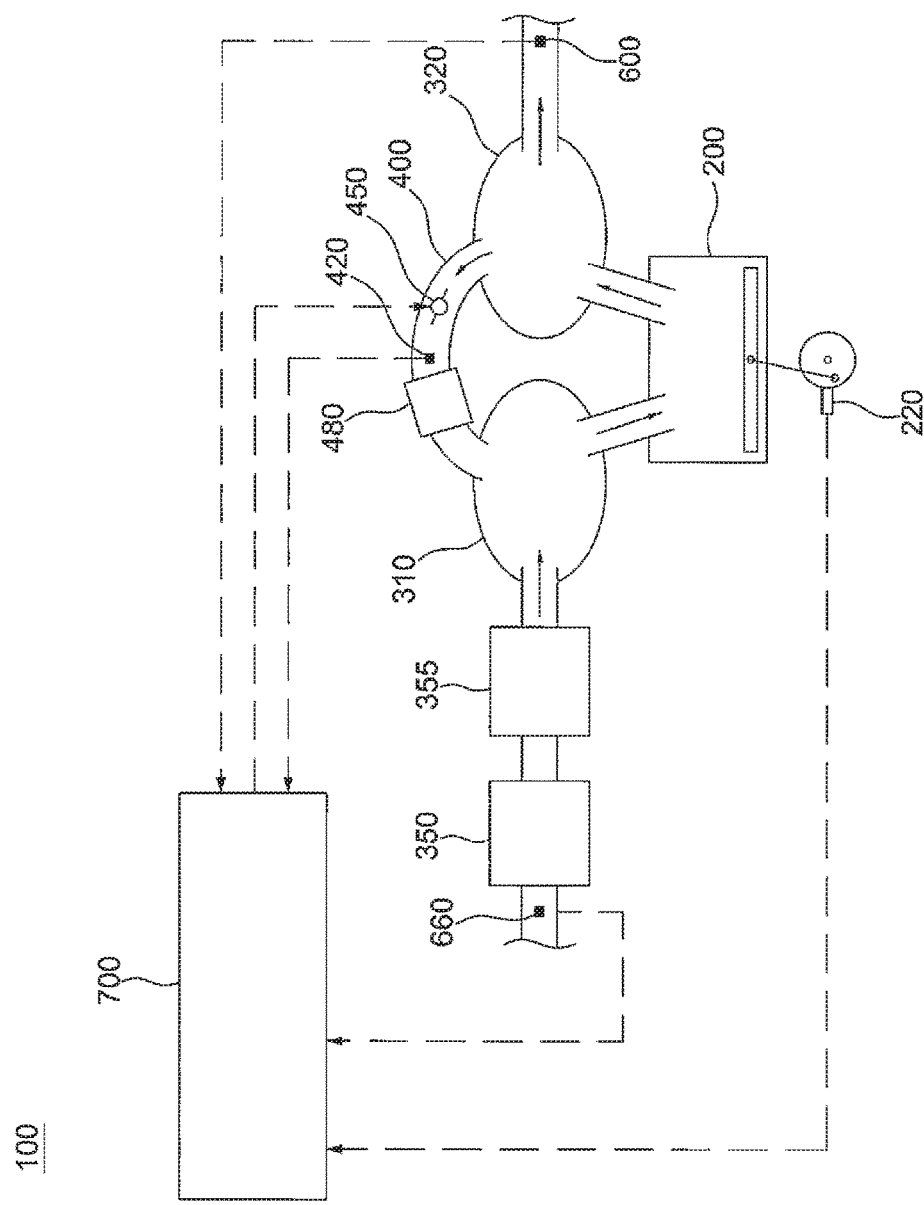
FIG. 1 is a view showing a configuration of an engine system to which an EGR valve control device according to an exemplary embodiment of the present invention is applied.
Figure 2:
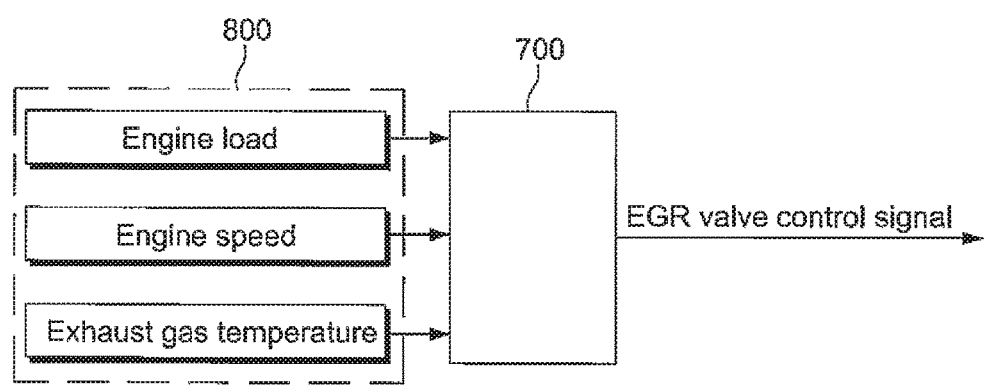
FIG. 2 is a view showing a configuration of the EGR valve control device according to the exemplary embodiment of the present invention.

FIG. 1 shows an embodiment of an engine system to which an EGR valve control device according to an exemplary embodiment is applied, and FIG. 2 is a view showing a configuration of the EGR valve control device according to the exemplary embodiment.

Referring to FIG. 1, an engine system 100 to which an EGR valve control device according to an exemplary embodiment is applied may include an engine 200, an engine speed sensor 220, an intake line 310, an exhaust line 320, a recirculation line 400, an EGR valve 450, an exhaust gas temperature measuring device 600, and a control unit 700. Furthermore, the engine system 100 may further include a supercharger 350, an intercooler 355, an EGR flow sensor 420, an EGR cooler 480, and a fresh air flow sensor 660.

The engine 200 is an engine using compressed natural gas (CNG) as fuel, and generates power by burning fuel. The engine speed sensor 220 may measure a speed of the engine 200, and may output a measured value to the control unit 700. The control unit 700 may be an electronic control unit (ECU).

The intake line 310 is connected to a combustion chamber of the engine 200, and air for combustion may be supplied to the combustion chamber of the engine 200 through the intake line 310. When the engine 200 includes a plurality of cylinders, the intake line 310 may be connected to the engine 200 through an intake manifold. The fresh air flow sensor 660 measures a flow rate of fresh air which enters through the intake line 310.

The supercharger 350 compresses fresh air which enters through the intake line 310. The intercooler 355 is disposed between the supercharger 350 and the intake line 310, and cools the fresh air compressed by the supercharger 350.

The exhaust line 320 is connected to the combustion chamber of the engine 200, and exhaust gas is discharged from the engine 200 through the exhaust line 320. When the engine 200 includes a plurality of cylinders, the exhaust line 320 may be connected to the engine 200 through an exhaust manifold.

The recirculation line 400 is branched off from the exhaust line 320, and then joins the intake line 310. Part of the exhaust gas discharged from the engine 200 is re-circulated to the intake line 310 through the recirculation line 400. The exhaust gas re-circulated through the recirculation line 400 is mixed with fresh air entering from the outside through the intake line 310, and is then supplied to the combustion chamber of the engine 200.

The EGR valve 450 is installed in the recirculation line 400, and regulates a flow rate of the exhaust gas which is re-circulated. The EGR cooler 480 is installed in the recirculation line 400, and decreases a temperature of the exhaust gas passing through the recirculation line 400. The EGR flow sensor 420 measures a flow rate of the exhaust gas which is re-circulated through the recirculation line 400.

The exhaust gas temperature measuring device 600 is installed in the exhaust line 320, and measures a temperature of the exhaust gas discharged through the exhaust line 320. The exhaust gas temperature measuring device 600 may be a temperature sensor.

Referring to FIG. 2, the engine system according to the exemplary embodiment may include an operating condition output unit 800 and a control unit 700.

The operating condition output unit 800 measures or calculates and then outputs operating conditions indicative of current operating status of the engine 200. The operating conditions output by the operating condition output unit 800 may be input to the control unit 700. One of the operating conditions which is essentially measured by the operating condition output unit 800 is a temperature of exhaust gas. Furthermore, the operating condition output unit 800 may measure or calculate and then output an engine load and an engine speed, and may measure or calculate and then output other operating conditions indicative of current operating status of the engine. The operating condition output unit 800 may directly measure and output operating conditions, or may calculate and output values measured by other means. The operating condition output unit 800 may include the exhaust gas temperature measuring device 600 and the engine speed sensor 220. Furthermore, the operating condition output unit 800 may include an ECU of a vehicle which calculates and outputs information input from various types of sensors of the vehicle.

The control unit 700 may receive the operating conditions output from the operating condition output unit 800, and may calculate an opening degree of an EGR valve. The control unit 700 may output a control signal corresponding to the calculated opening degree of the EGR valve to the EGR valve 450, and an opening degree of the EGR valve 450 may be regulated in response to the control signal. When operating conditions, such as an engine load and an engine speed, are input, the control unit 700 may calculate an opening degree of an EGR valve based on the input operating conditions. In this case, various methods may be used to determine the opening degree of the EGR valve. First, opening degrees of the EGR valve 450 for various operating conditions may be provided in the form of a look-up table through tests in advance. When the look-up table for the opening degrees of the EGR valve 450 is provided, the control unit 700 may obtain an opening degree value of the EGR valve 450 by substituting input operating condition information into the look-up table. As another method for calculating an opening degree of an EGR valve, a mathematical model of the engine system may be used. Once the mathematical model of the engine system with operating conditions set as variables has been determined, an opening degree of an EGR valve may be obtained by substituting operating conditions into the mathematical model.

Furthermore, the control unit 700 may compare a temperature of exhaust gas with a reference temperature, and may increase or maintain the opening degree of the EGR valve depending on whether the temperature of the exhaust gas exceeds the reference temperature or not. When the temperature of the exhaust gas does not exceed the reference temperature, the control unit 700 maintains the opening degree of the EGR valve 450. In contrast, when the temperature of the exhaust gas exceeds the reference temperature, the control unit 700 increases the opening degree of the EGR valve 450.

In this case, the control unit 700 may increase the opening degree of the EGR valve 450 by a preset increment. An increment value may be stored in the control unit 700. The increment may be a fixed constant value, or may be a value which varies depending on a temperature of exhaust gas. Furthermore, the increment may be determined based on the opening degree of the EGR valve 450. For example, the increment is proportional or inversely proportional to the opening degree of the EGR valve.

When the increment is a value which varies depending on a temperature of exhaust gas, the increment of the EGR valve may be determined using various methods. In one method, temperatures of exhaust gas may be set for intervals, increments may be set for the respective intervals, and an increment value corresponding to an interval may be selected based on the interval within which a currently input temperature of exhaust gas falls. In another method, a look-up table or mathematical model may be used, as in the methods of determining an opening degree of an EGR valve.

As the opening degree of the EGR valve becomes higher, the amount of exhaust gas to be re-circulated is increased, and thus a temperature of the engine combustion chamber is decreased. Accordingly, when the temperature of the exhaust gas exceeds the reference temperature, a larger amount of exhaust gas can be re-circulated to the combustion chamber by increasing the opening degree of the EGR valve 450, calculated according to the engine operating conditions, by means of the increment, thereby enabling the temperature of the exhaust gas to be rapidly decreased.

An embodiment of an EGR valve control method will be described with reference to the components of the engine according to the above-described exemplary embodiment.

Figure 3:
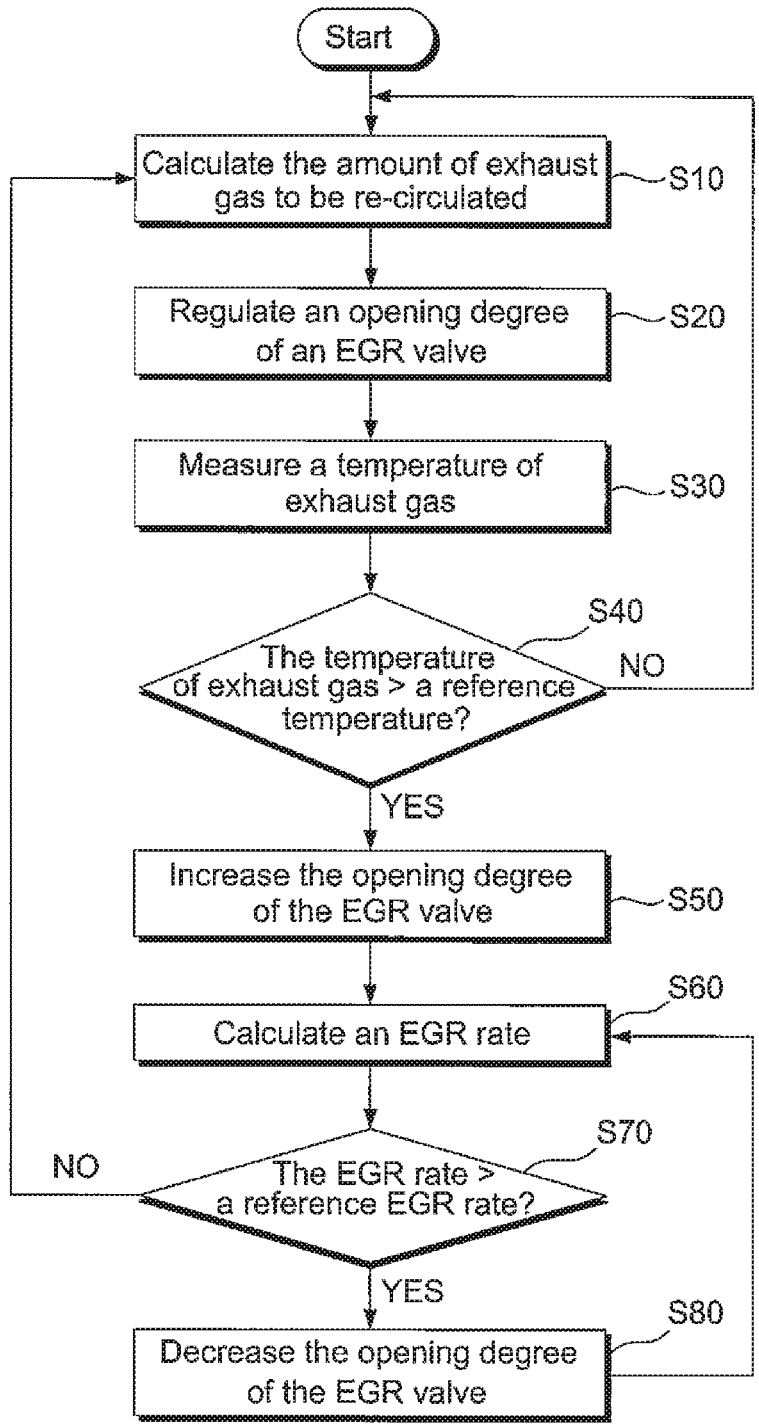
FIG. 3 is a flowchart of an EGR valve control method according to an exemplary embodiment of the present invention.

FIG. 3 is a flowchart of an EGR valve control method according to an exemplary embodiment. Referring to FIG. 3, the EGR valve control method according to the exemplary embodiment may include: step S10 of calculating the amount of exhaust gas, to be transferred from the exhaust line 320 to the intake line 310, according to engine operating conditions; step S20 of regulating an opening degree of the EGR valve 450 based on the calculated amount of exhaust gas; step S30 of measuring a temperature of exhaust gas discharged from the combustion chamber; step S40 of determining whether the temperature of the exhaust gas discharged from the combustion chamber preset exceeds the reference temperature; and step S50 of increasing the opening degree of the EGR valve 450 by a preset increment when the temperature of the exhaust gas discharged from the combustion chamber preset exceeds the reference temperature.

At step S10 of calculating the amount of exhaust gas to be re-circulated, the operating condition output unit 800 may measure or calculate various operating conditions indicative of current operating status of the engine 200. Although the operating conditions may be an engine load and an engine speed, the types of operating conditions are not limited thereto, but they may be various types of information, such as a boost pressure, a fresh air flow rate, etc. Information about the operating conditions may be output to the control unit 700. The control unit 700 may calculate the opening degree of the EGR valve 450 based on the operating conditions transferred from the operating condition output unit 800.

Once the opening degree of the EGR valve 450 has been calculated, the control unit 700 may regulate the opening degree of the EGR valve 450 by outputting a control signal to the EGR valve 450 at step S20. After the opening degree of the EGR valve 450 has been regulated, a temperature of exhaust gas discharged from the combustion chamber may be measured by the exhaust gas temperature measuring device. The measured temperature of the exhaust gas is transferred to the control unit 700. The control unit 700 may determine whether the measured temperature of the exhaust gas exceeds the preset reference temperature at step S40.

When the temperature of the exhaust gas does not exceed the reference temperature, the method may return to step S10 of calculating the amount of exhaust gas to be transferred from the exhaust line 320 to the intake line 310 according to the engine operating conditions, and may repeatedly perform the above-described process.

In contrast, when the temperature of the exhaust gas exceeds the reference temperature, the opening degree of the EGR valve 450 may be increased by a preset increment. After the opening degree of the EGR valve 450 has been increased, the method may return to step S10 of calculating the amount of exhaust gas to be transferred from the exhaust line 320 to the intake line 310 according to the engine operating conditions, and may repeatedly perform the above-described process.

More specifically, for example, the control unit 700 may calculate the amount of exhaust gas passing through the recirculation line 400 according to the operating conditions of the engine 200, and may regulate the EGR valve 450 to a first EGR valve opening degree. Thereafter, when the temperature of the exhaust gas measured by the exhaust gas temperature measuring device 600 exceeds the preset reference temperature, the control unit 700 may regulate the EGR valve 450 to a second EGR valve opening degree obtained by increasing the first EGR valve opening degree by a preset increment.

In this case, when there is no change in engine operating conditions but the temperature of the exhaust gas is decreased to a reference temperature or lower during the repetition of the above process, the increased opening degree of the EGR valve 450 may be decreased to an opening degree of the EGR valve 450 calculated according to the engine operating conditions.

In this case, the reference temperature may vary depending on materials of parts constituting the exhaust line 320. A reference temperature for general-quality parts of the exhaust line 320 may be a value between 700 and 850° C. The general parts of the exhaust line 320 are subjected to high-temperature transformation from 800° C. Since the parts of the exhaust line 320 have a temperature lower than the temperature of the exhaust gas by about 50° C., a maximum reference temperature of exhaust gas may be 850° C. However, when durability of the exhaust line 320 is taken into account, the reference temperature of exhaust gas is preferably 750° C., which is lower than 850° C. by 100° C. Furthermore, when margin of safety is additionally taken into account, the reference temperature of exhaust gas is preferably about 720° C.

Meanwhile, the EGR valve control method according to the exemplary embodiment may further include: step S50 of increasing the opening degree of the EGR valve 450 by a preset increment; step S60 of calculating an EGR rate; step S70 of determining whether the EGR rate exceeds a reference EGR rate; and step S80 of decreasing the opening degree of the EGR valve 450 when the EGR rate exceeds the reference EGR rate. A higher EGR rate is favorable for a reduction in a temperature of exhaust gas, but may have a bad influence on combustion efficiency of the engine. Incomplete combustion can be prevented from occurring in the engine due to an excessively high EGR rate by the additional steps S60, S70 and S80 performed after step S50 of increasing the opening degree of the EGR valve 450 by the preset increment.

Once the EGR valve 450 has been controlled by the control signal of the control unit 700 at step S60, the amount of exhaust gas to be re-circulated and the amount of fresh air entering through the intake line 310 are determined, with the result that the EGR rate based on the corresponding opening degree of the EGR valve 450 can be calculated. The EGR rate may be calculated using the following equation:

EGR rate=the amount of exhaust gas to be re-circulated/the amount of air entering into the combustion chamber =the amount of exhaust gas to be re-circulated/the amount of exhaust gas to be re-circulated+the amount of fresh airy In this case, the amount of exhaust gas to be re-circulated may be measured by the EGR flow sensor 420, and the amount of fresh air may be measured by the fresh air flow sensor 660. Meanwhile, apart from the method for directly measuring the amount of exhaust gas to be re-circulated and the amount of fresh air by using the flow sensors in order to calculate the EGR rate, the amount of exhaust gas to be re-circulated and the amount of fresh air may be indirectly obtained through calculation using temperatures and pressures of exhaust gas and fresh air.

Once the EGR rate has been calculated, whether the EGR rate exceeds the reference EGR rate is determined by comparing the EGR rate with the preset reference EGR rate at step S70. If the EGR rate exceeds the reference EGR rate, there is strong possibility that incomplete combustion occurs in the engine, and thus the opening degree of the EGR valve 450 is decreased at step S80. After the opening degree of the EGR valve 450 has been decreased, the EGR rate is re-calculated at step S60, the EGR rate is compared with the reference EGR rate at step S70, and the opening degree of the EGR valve 450 is re-decreased when the EGR rate is higher than the reference EGR rate at step S80. As described above, the above process may be repeated until the EGR rate becomes equal to or lower than the reference EGR rate. In this case, the reference EGR rate may be a value in a range from 20 to 30%, for example, 25%. However, the reference EGR rate may have various values different from 25% depending on characteristics of the engine.

Meanwhile, when the calculated EGR rate is equal to or lower than the reference EGR rate, the method returns to step S10 of calculating the amount of exhaust gas to be transferred from the exhaust line to the intake line according to the engine operating conditions, and may repeatedly perform the above-described process.

The above-described EGR valve control method according to the exemplary embodiment is based on an open-loop control system, and is configured to correct the opening degree of the EGR valve 450 only when the temperature of exhaust gas exceeds the reference temperature. Since the temperature of the exhaust gas may be measured using the exhaust gas temperature sensor, an additional separate sensor does not need to be provided, thereby enabling a manufacturing cost to be reduced and also enabling a structure of an engine system to be simplified.

For a CNG engine, particularly a theoretical air-fuel ratio CNG engine, it is more important to EGR control to prevent a temperature of exhaust gas from increasing to a reference value or higher through EGR than to accurately control an EGR rate. Accordingly, an effect of preventing a temperature of exhaust gas from increasing to a reference value or higher without considerably degrading performance of a theoretical air-fuel ratio CNG engine can be achieved even by means of an open-loop control system, such as that of the exemplary embodiment.

The above description is intended merely to illustrate the technical spirit of the present invention. It will be apparent to those having ordinary knowledge in the art to which the present invention pertains that various modifications, alterations, and substitutions are possible without departing from the essential features of the present invention. Accordingly, the embodiments disclosed herein are not intended to limit the technical spirit of the present invention, and the scope of the technical spirit of the present invention is limited by these embodiments. The range of protection of the present invention should be defined based on the attached claims, and all technical spirits falling within a range equivalent to the claims should be construed as being included in the claims of the present invention.

INDUSTRIAL APPLICABILITY

The engine including a control unit for regulating an opening degree of an EGR valve and the method for controlling an EGR valve of an engine according to the embodiments of the present invention can appropriately control a temperature of exhaust gas by regulating an opening degree of the EGR valve by using the exhaust gas temperature sensor, generally and basically mounted in a vehicle, without a need to mount an additional sensor.

The invention claimed is:

1. An engine including a control unit for regulating an opening degree of an exhaust gas recirculation (EGR) valve, the engine comprising:
   a combustion chamber;
   an intake line configured to supply air to the combustion chamber;
   an exhaust line configured to discharge exhaust gas discharged from the combustion chamber;
   a recirculation line configured to transfer part of the exhaust gas, discharged through the exhaust line, to the intake line;
   an exhaust gas temperature measuring device configured to measure a temperature of the exhaust gas discharged from the combustion chamber;
   an EGR valve configured to regulate an amount of exhaust gas passing through the recirculation line; and
   a control unit configured to calculate an amount of exhaust gas passing through the recirculation line according to engine operating conditions, and to regulate the EGR valve to a first EGR valve opening degree;
   wherein the control unit regulates the EGR valve to a second EGR valve opening degree, obtained by increasing the first EGR valve opening degree by a preset increment, when the temperature of the exhaust gas measured by the exhaust gas temperature measuring device exceeds a preset reference temperature, and
   wherein the control unit calculates an EGR rate in a state of having been regulated to the second EGR valve opening degree, and decreases the opening degree of the EGR valve when the EGR rate exceeds a reference EGR rate, or regulates the EGR valve to the first EGR valve opening degree when the temperature of the exhaust gas measured by the exhaust gas temperature measuring device is decreased to the reference temperature or lower.

2. The engine of claim 1, wherein the engine uses compressed natural gas as fuel.

3. The engine of claim 1, wherein the operating conditions comprise an engine load and an engine speed.

4. The engine of claim 1, wherein the increment is set to a value which varies depending on the opening degree of the EGR valve calculated according to the engine operating conditions.

5. The engine of claim 1, wherein the reference temperature is a value in a range from 700° C. to 850° C.

6. The engine of claim 1, wherein the reference EGR rate is a value in a range from 20% to 30%.

7. A method for controlling an exhaust gas recirculation (EGR) valve of an engine, the method comprising:
   calculating an amount of exhaust gas to be transferred from an exhaust line to an intake line according to engine operating conditions;
   regulating an opening degree of an EGR valve based on the calculated amount of exhaust gas;
   measuring a temperature of exhaust gas discharged from a combustion chamber; and
   increasing the opening degree of the EGR valve by a preset increment when the temperature of the exhaust gas discharged from the combustion chamber exceeds a preset reference temperature;
   calculating an EGR rate in a state of having been regulated to the second EGR valve opening degree;
   determining whether the EGR rate exceeds a reference EGR rate;
   decreasing the opening degree of the EGR valve when the EGR rate exceeds the reference EGR rate; and
   regulating the EGR valve to the first EGR valve opening degree when the temperature of the exhaust gas measured by the exhaust gas temperature measuring device is decreased to the reference temperature or lower.

8. The method of claim 7, wherein the operating conditions comprise an engine load and an engine speed.

9. The method of claim 7, wherein increasing the opening degree of the EGR valve comprises setting the increment to a value which varies depending on the opening degree of the EGR valve calculated according to the engine operating conditions.

10. The method of claim 7, wherein the reference temperature is a value in a range from 700° C. to 850° C.

11. The method of claim 7, wherein the reference EGR rate is a value in a range from 20% to 30%.

* * * * *